Sept. 5, 1967     J. H. BOWDEN ET AL     3,339,618
PROCESS FOR PREPARING POWDER AND GRANULAR
CALCIUM CHLORIDE PRODUCTS
Filed June 13, 1963
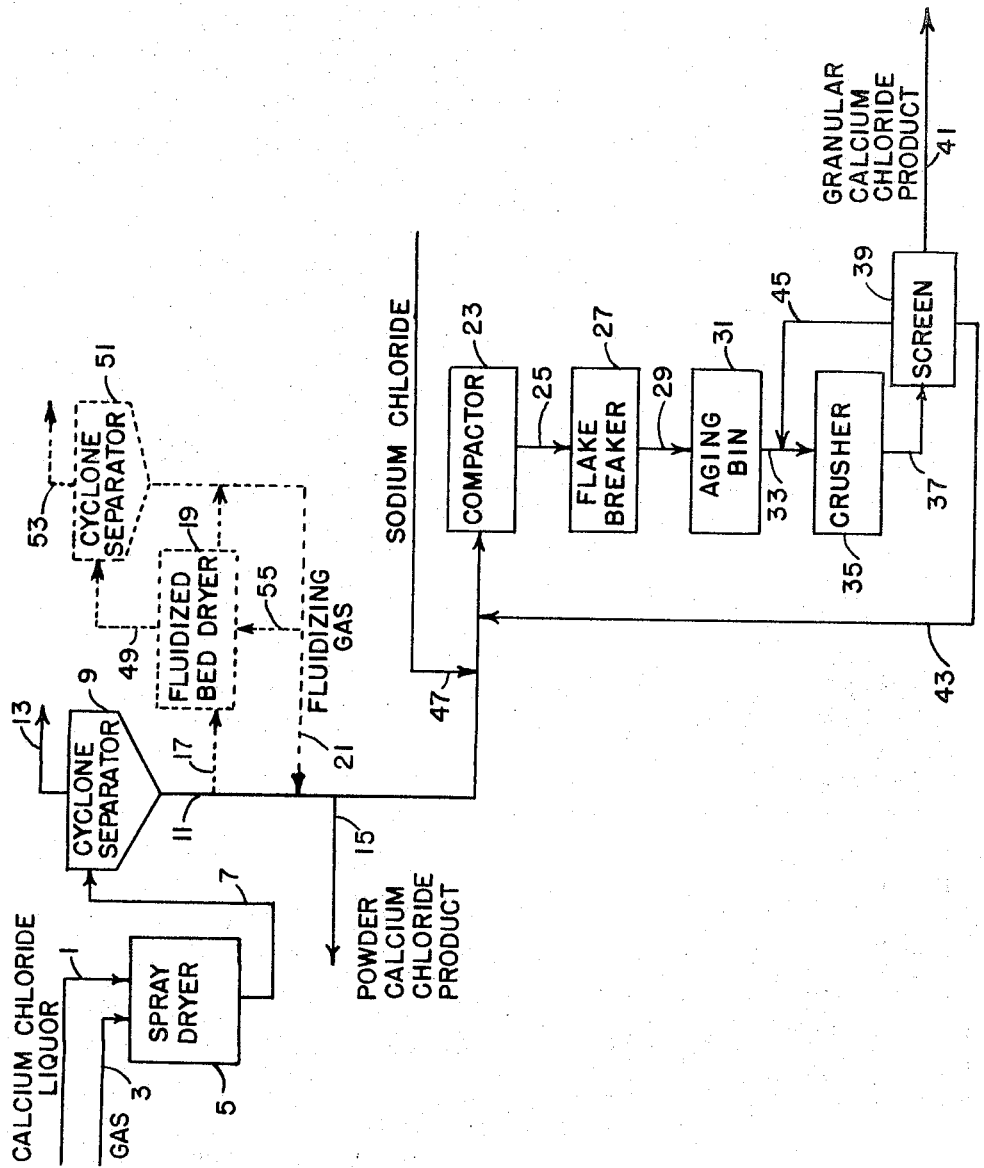
John H. Bowden
Clifford T. Terry
*INVENTORS*
BY *Richard H. Brink*
Attorney United States Patent Office 3,339,618
Patented Sept. 5, 1967

3,339,618
PROCESS FOR PREPARING POWDER AND GRANULAR CALCIUM CHLORIDE PRODUCTS
John H. Bowden, Wyandotte, Mich., and Clifford T. Terry, Windsor, Ontario, Canada, assignors to Wyandotte Chemicals Corporation, Wyandotte, Mich., a corporation of Michigan
Filed June 13, 1963, Ser. No. 287,593
6 Claims. (Cl. 159—48)

This invention relates to a process for preparing calcium chloride. In one of its aspects it relates to a process for preparing finely divided anhydrous calcium chloride powder. In another one of its aspects it relates to a process for preparing finely divided hydrated calcium chloride powder. In still another of its aspects it relates to a process for preparing granular calcium chloride.

Calcium chloride is used in the arts for extensive purposes. For many years the material has been placed on roads and road beds for dustlaying and soil stabilization. Both calcium chloride liquor and calcium chloride particles have been utilized for this purpose.

Another important use of calcuim chloride is for melting ice. This use has become even more important recently due to the new turnpike road systems being built throughout the U.S. The roads must be kept ice-free to maintain normal flow of the large volume of traffic that uses these roads. In general, calcium chloride having a high particle density, such as pellets, has been employed for this purpose.

Calcium chloride is also used as an additive in concrete mixes to prevent freezing at low temperatures and to impart early set strength. Quickly soluble calcium chloride such as powder is most useful for this purpose. While these are only a few of the uses for calcium chloride, at the present time a high volume of calcium chloride is used for these purposes.

At the present time there are two conventional commercial processes for preparing calcium chloride. In the well known flake process, weak calcium chloride liquor is concentrated in a vacuum evaporator until a liquor of about 60% by weight calcium chloride is obtained. At this point the slurry is transferred to open pots and the evaporation is continued to about a 73% liquor. The hot liquor is then solidified on the cool surface of a revolving flaker drum. The flaked product obtained is further dried by contacting it with a current of heated air. The product is then screened and the particles obtained contain about 77% calcium chloride.

In the other process, calcium chloride liquor is concentrated to at least 50% calcium chloride and then sprayed onto semi-anhydrous particles of calcium chloride in a rotary drum. The product that is obtained is in the form of round pellets and is dried to about an anhydrous calcium chloride.

Whlie both the flake and pellet products are presently being marketed in large volume, they have certain disadvantages. The flake product is generally marketed only as a hydrate of calcium chloride since it is difficult and expensive to convert it into an anhydrous product. Flakes are very friable and break up during shipping. In addition the conventional flake product has a low particle density which is a disadvantage in its use for stabilizing roads and for ice removal since this property tends to cause the particles to blow away and to have a low ice penetration rate.

The pellet form of calcium chloride also has disadvantages. First due to the physical shape, essentially spherical, the particles tend to roll off ice covered roads. In addition, since only a very small area of each particle is in contact with the ice, the ice melting properties are impaired. Thus while pellets are considerably more effective than flake for ice melting purposes, they still have certain undesirable features. In addition, calcium chloride solutions are difficult to prepare from pellets due to the low solubility rate of pellets.

Thus it is apparent that the present commercial processes produce products that have several disadvantages. In addition, the two commercial processes are not sufficiently flexible to produce a variety of products. While the shortcomings of the present products and processes are well known in the art heretofore no solution to the problem has been discovered that was commercially feasible.

It is therefore an object of this invention to provide a method of preparing calcium chloride having improved properties.

Another object of this invention is to provide a method for preparing both hydrated and anhydrous calcium chloride products.

A further object of this invention is to provide a method for preparing finely divided calcium chloride powder.

A still further object of this invention is to provide a method for preparing granular calcium chloride.

These and other objects of this invention which will become apparent as the specification proceeds are achieved by this invention.

In summary, the process of this invention comprises spraying calcium chloride liquor into an essentially dry gas stream at elevated temperature to produce finely divided calcium chloride powder.

It is well known in the art that solid calcium chloride is difficult to produce from aqueous solutions of calcium chloride. The difficulty is due to the fact that during evaporation of water calcium chloride passes through several states of hydration. While the hydrates are solids at ambient temperature they cannot be dried as solids to produce monohydrate or anhydrous calcium chloride. If, for example, an attempt is made to dry the hexahydrate or tetrahydrate of calcium chloride as a solid, the temperature necessary for drying will cause water to be liberated which in turn dissolves the calcium chloride solid. Accordingly, a solution or slurry results which clogs and/or runs out of the drying equipment. Therefore, in the past calcium chloride liquor was concentrated to about the dihydrate state before it was converted to a solid or slightly weaker liquor was contacted with anhydrous or semi-anhydrous particles thereby forming particles having a composition of about calcium chloride monohydrate or a mixture of monohydrate and dihydrate. Solid particles having a composition of calcium chloride monohydrate or a mixture of monohydrate and dihydrate are easier to dry than those of the higher hydrates of calcium chloride. Therefore, it was completely unexpected when it was discovered that dilute solutions of calcium chloride could be spray dried to hydrated or anhydrous products by the process of this invention without incurring the problems normally associated with drying the higher hydrates of calcium chloride.

Due to the fact that the present process utilizes low concentration calcium chloride liquors, the costly concentration methods used in the past to obtain liquor containing a very high concentration of calcium chloride have been eliminated along with the expensive equipment necessary for such concentration methods. In addition, both the flake and pellet processes used commercially require a drying step after the flake or pellets are formed. This has also been eliminated by the present invention.

The process of this invention is also extremely versatile. Powder or granular calcium chloride products are prepared containing from about 25% by weight of moisture to less than 1%. The properties of the powder and granular products are very desirable. The powder dissolves rapidly in water to form calcium chloride liquors due to the large surface area of the particles. The quick solubility property is extremely valuable for its use in concrete mixes and chemical processes. The granular product has very high particle density and bulk density, irregular shape, and adheres well to ice. Due to the high partcile density of the granular product the particles penetrate quickly through ice. The flat surfaces of the granular product insure a large area of contact with ice.

In accordance with the present invention calcium chloride is recovered from either a dilute or concentrated aqueous solution of calcium chloride or slurry. Economically it is preferable to employ a solution containing at least about 35% by weight of calcium chloride. In addition to calcium chloride, impurities such as sodium chloride and magnesium chloride may be present. In one embodiment of the present invention, wherein an ice melting product is produced, the feed to the spray dryer is a slurry of sodium chloride and calcium chloride. However, in most instances where the desired product is calcium chloride, only a small amount of impurities should be present. Preferably the impurities should not exceed 6% by weight, calculated on a dry basis so that the hydrated and anhydrous calcium chloride products prepared by the process of this invention will meet the chemical composition specifications for Type 1—regular calcium chloride, and Type 2—concentrated calcium chloride, in Standard Specifications for Calcium Chloride, A.S.T.M. Designation: D98–48. The following table presents the chemical composition of Type 1 and Type 2 calcium chloride.

|  | Type 1 | Type 2 |
| --- | --- | --- |
| CaCl₂, min. percent | 77.0 | 94.0 |
| Total alkali chlorides (as NaCl), max., percent | 2.0 | 5.0 |
| Total magnesium (as MgCl₂), max., percent | 0.5 | 0.5 |
| Other impurities (not including water), max., percent | 1.0 | 1.0 |

The source of the aqueous solution of calcium chloride is immaterial, however, natural occuring brine and distiller waste liquor from the ammonia-soda process are convenient sources. The liquor from both of these sources contains impurities and is usually purified and concentrated before use in the process. The methods for purifying these liquors are well known in the art.

The dilute liquor is concentrated by the use of any of the conventional equipment useful for this purpose, for example, vacuum evaporators. During concentration sodium chloride crystallizes from solution if present in a large amount and may conveniently be removed by filtration of the liquor after concentration has been completed.

While calcium chloride liquor containing as low as 5% by weight of calcium chloride may be used in the process, liquor containing at least about 35% by weight of calcium chloride is preferred and liquor containing at least about 50% is even more preferable, especially for producing anhydrous calcium chloride. Any liquor having a calcium chloride concentration above the foregoing minimum concentrations may be employed. However, the maximum concentration is usually dictated by economics. It has been found uneconomical to concentrate dilute liquor above 60% by weight of calcium chloride. Also, more concentrated liquors become increasingly difficult to handle and those which contain solids cause the spray nozzles to wear excessively.

The concentrated aqueous solution of calcium chloride is sprayed through a nozzle into the drying chamber of a spray dryer or introduced by some other device to form droplets, such as a spinning disc machine. Droplets that form and constitute a spray are contacted by a stream of gas at elevated temperature which causes evaporation of the water and the formation of anhydrous or hydrated calcium chloride particles. In general, the calcium chloride solution is maintained at a temperature sufficiently high to permit ease in handling and spraying. For example, 56% calcium chloride liquor at 175° F. and 35% calcium chloride liquor at 130° F. have been found suitable for spray drying.

The stream of gas is preferably introduced cocurrent with the hot calcium chloride feed in the upper part of the drying chamber. The drying gas may be any gas that is nonreactive with calcium chloride, for example, air, nitrogen, carbon dioxide, and the like. Air is preferable for obvious economic reasons. The drying gas must be essentially dry. A relative humidity below about 40% is adequate for the process. However, it should be pointed out that in order to obtain a product having the desired degree of hydration and exit temperature it may be necessary to control the humidity of the drying gas. A convenient method of adjusting the humidity of the drying gas would be to introduce water or steam into the hot drying gas entering the spray dryer. Before entering the spray drying equipment, the gas may be either preheated directly by the combustion of natural gas or indirectly to the required temperature for drying.

The gas is introduced into the drying chamber at a temperature of at least about 400° F. to porduce hydrated calcium chloride and preferably 700° F. to produce anhydrous calcium chloride. Due to materials of construction of the equipment the maximum temperature has been limited to 1500° F. However, it should be emphasized that any temperature above 1500° F. may be employed provided decomposition of calcium chloride does not occur and the equipment will withstand the temperature. With respect to gas temperature, it is convenient to control the inlet gas temperature by the outlet temperature of the gas leaving the drying chamber after contacting the droplets of calcium chloride. For example, it has been found that for producing hydrated calcium chloride the outlet temperature should be about 275 to 325° F. and preferably about 300° F. and for anhydrous calcium chloride 350 to 400° F. and preferably about 375° F. Thus the inlet temperature of the gas is indirectly controlled by the outlet temperature.

A wide variety of conventional spray nozzles may be used, however, it is required that the particular nozzle employed produce a fine spray. Spraying Systems Co. Type ST Spray Dry Nozzle No. 5427 having an orifice of 0.055 inch produced a fine spray of calcium chloride when calcium liquor was fed to the nozzle at a pressure of 2000 to 3000 p.s.i.g. and was found to be very satisfactory. Calcium chloride builds up on the drying chamber walls and a highly hydrated product results when a coarse spray is used.

Contact between droplets of the calcium chloride spray and hot drying gas results in finely divided calcium chloride particles being produced. The quantity of water in the particles is dependent upon calcium chloride feed concentration, spray droplet size, drying gas temperature and humidity. Products ranging in water content from 25% to less than 1% are readily produced by this process. In general, calcium chloride products containing 2% or less moisture are considered anhydrous. Thus it is apparent that the process of this invention is very flexible. Spray drying equipment useful in this invention is commercially available. However, preferably the equipment should be constructed so that the drying gas is introduced cocurrent to the droplets of calcium chloride to prevent calcium chloride build-up on the spray nozzle. In addition, multi-nozzle spray drying equipment is very useful in carrying out the present invention.

The finely divided calcium chloride powder produced by contacting calcium chloride liquor with a hot gas stream is conveniently carried out of the drying chamber with the gas and conducted to gas-solids separating equipment such as a cyclone separator. The product from the gas-solids separator, whether hydrated or anhydrous, is a finely divided calcium chloride powder and is readily soluble in water due to its large surface area, free flowing, convenient to handle and easy to ship.

At this point it should be pointed out that anhydrous calcium chloride may be produced, if desired, by spray drying calcium chloride liquor to at least 25% moisture by weight and then further drying the hydrated calcium chloride to the anhydrous state in conventional drying equipment such as a fluidized bed dryer.

Included within the scope of this invention is the further processing steps necessary to produce granular calcium chloride from the finely divided powder. Calcium chloride powder is compacted by conventional mechanical densifying equipment having a forced feeder into a thin sheet having a thickness of about 1/16 to 3/8 inch. A convenient method of compacting the calcium chloride powder is to pass it between two cylindrical rolls constructed so that they exert a pressure of from about 1000 to 4000 p.s.i. pressure on the powder and preferably 2000 to 3500 p.s.i. pressure. In general, 4000 p.s.i. pressure should not be exceeded to prevent shearing of the sheet. It is required that the temperature of the calcium chloride feed to the compactor be at least about 200° F. to obtain adequate compaction and preferably about 200° F. to 325° F., with 275° F. being an excellent operating temperature. It is readily apparent that calcium chloride powder prepared by methods other than spray drying may also be compacted into a granular product by the process of this invention.

In addition to compacting calcium chloride alone it has been found that mixtures of calcium chloride and sodium chloride can also be compacted and a granular product formed therefrom. It is convenient to reintroduce pre-dried sodium chloride which separated from the calcium chloride liquor during concentration into the system after the spray dryer and mix it with the calcium chloride powder before compaction. Granular products containing from 5 to 90% by weight of sodium chloride are very useful for ice melting, and conveniently prepared by the process of this invention.

The sheet that is formed by the compactor may be continuous. However, usually the sheet breaks into flakes of varying size as it emerges from the rolls. Preferably the material from the compactor is fed to a flake breaker before crushing which gently breaks the sheet into flake-like particles that are easier to handle. This type of equipment is commercially available.

The calcium chloride particles from the flake breaker are conveyed to a crusher which breaks the flake-like particles into granular calcium chloride of the desired particle size. However, to reduce the amount of fines obtained during crushing, it is advantageous to age the calcium chloride sheet or particles from the compactor or flake breaker for about 20 minutes to about 1 hour or more before crushing. Usually during this period the temperature of the calcium chloride drops about 40 to 50° F. The aging is conveniently carried out by holding the material in a bin.

After crushing, the material obtained is screened to the desired screen size. The undersized material is returned to the compactor and the oversized material returned to the crusher. It is apparent that the granular product may contain material having a wide range of screen sizes or a specific screen size.

A preferred mode of operation for carrying out the above described process on a commercial scale is illustrated diagrammatically in the drawing. Hot concentrated calcium chloride liquor is introduced into spray dryer 5 through line 1 as a fine spray. The fine spray of calcium chloride is contacted within the spray dryer with hot drying gas which enters through line 3 cocurrent to the spray. Finely divided calcium chloride powder is formed in the sprayer dryer either in the anhydrous or hydrated state depending upon calcium chloride liquor concentration and drying gas temperature. The calcium chloride powder is carried by the drying gas from the spray dryer and through line 7 to cyclone separator 9, where the calcium chloride powder is separated from the drying gas. The powder is conducted from the cyclone through line 11 and the drying gas discharged through line 13. At this point, if desired, the calcium chloride powder may be taken off as a product through line 15.

As an alternate procedure, anhydrous calcium chloride may be prepared by first drying the calcium chloride liquor to hydrated calcium chloride powder in the spray dryer and then after separating the powder from the drying gas in cyclone separator 9 the powder is conducted through lines 11 and 17 to fluidized bed dryer 19 and dried to the anhydrous state. Fluidizing gas enters the dryer through line 55 and calcium chloride dust laden gas leaves the dryer through line 49. A gas-solids separation is made in cyclone separator 51. Calcium chloride powder from both dryer and separator is conducted to line 21 and returned to line 11. The waste gas leaves the cyclone separator through line 53.

If it is desired to prepare granular calcium chloride, calcium chloride powder is not taken off through line 15 but conducted through line 11 to roll-type compactor 23 while maintaining the temperature of the material at about 200 to 375° F. The powder is pressed into a sheet about 1/16 to 3/8 inch thick by the rolls and is conducted through line 25 to flake breaker 27 and broken into flake-like particles. The flake-like particles are conducted through line 29 to aging bin 31, where they are aged for about 20 minutes to 1 hour. After aging, the flakes are transported through line 33 to crusher 35. Here the flakes are crushed to the desired size and then conducted to screens 39 through line 37. The granular calcium chloride produced by the crusher is screened to meet predetermined particle size specifications and the desired particle size fraction is taken off as a product by line 41. The product may be stored, packaged or otherwise disposed of. The undersized material from the screens is returned to compactor 23 through line 43 and the oversized material is returned to crusher 35 through line 45.

By a slight modification of the process a granular product containing calcium chloride and sodium chloride may be prepared that is very useful for ice melting. Sodium chloride is introduced into the system through line 47 and mixed with the calcium chloride powder before being compacted in compactor 23 into a sheet. From this point on, the process is identical to that described hereinabove for preparing granular calcium chloride.

The following examples are presented to particularly illustrate the invention but should not be used to limit, unduly, the scope of the invention.

*Example 1*

The spray dryer used in all of the following runs was a Proctor and Schwartz spray dryer 40 feet in over-all height and 10 feet in diameter with a straight cylindrical drying chamber 16 feet high and equipped with a Spraying Systems Co. type ST spray dry nozzle. The nozzle has a stainless steel body, cap and core body and a tungsten carbide orifice insert in the core tip. The core was a No. 27 flat top core having 4 grooves of 0.025 inch nominal width and 0.048 inch nominal depth. Type ST spray dry nozzle No. 5027 having a 0.070 inch orifice was used for Runs 1–3, type 5 spray dry nozzle No. 5427 having a 0.055 inch orifice was used for Runs 4–9, and type ST spray dry nozzle No. 5027 having a 0.070 inch orifice was used for Runs 10 and 11. Air preheated by the combustion of natural gas was introduced cocurrent with the hot calcium chloride feed at the upper part of the drying chamber. Calcium chloride powder produced was carried out of the equipment through a duct at the bottom of the spray dryer with the drying gas and conducted to a cyclone where the finely divided calcium chloride product was separated from the gas.

For compacting the finely divided calcium chloride powder produced in the spray dryer, a Komarek-Greaves and Co. compacting press with double drum densifying rolls 3 inches wide x 9 3/8 inches in diameter with continuous corrugations (cylindrical segments) running across the width of the roll ⅜ inch wide x ⅛ inch deep and with a forced feed screw was used. The compactor was powered by a 5 HP motor for the rolls and a 2 HP variable speed motor for the feeder.

(A) Runs 1 to 11 illustrate spray drying calcium chloride liquor according to the process of this invention. Calcium chloride liquors having from 35 to 58% by weight of calcium chloride were utilized. The products obtained ranged in moisture content from 0.9 to 18.6%. The operating conditions used for the runs are presented in Table I and the screen analysis of the products are presented in Table II.

The wide range of moisture content in the calcium chloride products of Runs 1–11 illustrates the versatility of the process. In addition, the products are of fine particle sizes as exhibited by Table II, have high bulk density as shown in Table I and are exceptionally free flowing.

(C) After compacting and aging for about 20 minutes, the sheet of calcium chloride was milled in an Allis-Chalmers double roll mill to the desired particle size. The rolls were 9" diameter having 14 serrations per inch spiraled.

Table V illustrates the properties of the product obtained after milling compacted calcium chloride sheet.

TABLE V.—PRODUCT FROM MILL

|  | Run A | Run B | Run C |
|---|---|---|---|
| Percent Moisture | 0.9 | 0.9 | 18.6 |
| Breakdown (percent) | 3.8 | 4.0 | 3.2 |
| Bulk Density (lbs./ft.³) | 58 | 58 | 56 |
| Particle Density | 120 | | |

The anhydrous granular product was found to have a significantly greater particle density than commercially available anhydrous pellet, 120 versus 108.

TABLE I.—SPRAY DRYING CALCIUM CHLORIDE LIQUOR

| Run | Nozzle Pressure, p.s.i.g. | Feed | | | Drying Gas | | Product | |
|---|---|---|---|---|---|---|---|---|
| | | Conc., percent CaCl₂ | Temp., °F. | Rate. Gal./hr. | Inlet Temp., °F. | Outlet Temp., °F. | Moisture, percent | Bulk Density, Lbs./cu. ft. |
| 1 | 2,000 | 35 | 125 | 153 | 670 | 310 | 12.2 |  |
| 2 | 2,000 | 43 | 125 | 57 | 500 | 310 | 16.5 | 60 |
| 3 | 1,000 | 43 | 130 | 95 | 575 | 320 | 16.6 |  |
| 4 | 2,000 | 56 | 180 | 71 | 500 | 300 | 17.3 | 49 |
| 5 | 3,000 | 56 | 170 | 54.5 | 605 | 325 | 7.1 | 35 |
| 6 | 3,000 | 56 | 155 | 54.5 | 455 | 275 | 18.6 | 63 |
| 7 | 2,000 | 56 | 185 | 45 | 715 | 360 | 2.5 | 27 |
| 8 | 3,000 | 56 | 175 | 54.5 | 715 | 365 | 1.8 | 26 |
| 9 | 3,000 | 56 | 185 | 220 | 1,160 | 375 | 0.9 | 20 |
| 10 | 2,000 | 58 | 185 | 71 | 500 | 300 | 17.3 | 48.7 |
| 11 | 2,000 | 58 | 185 | 71 | 700 | 350 | 3.0 | 23.3 |

TABLE II.—SCREEN ANALYSIS OF SPRAY DRIED CALCIUM CHLORIDE

| Tyler Screen Mesh | Percent retained on— | | | | | | | | | | |
|---|---|---|---|---|---|---|---|---|---|---|---|
| | Run 1 | Run 2 | Run 3 | Run 4 | Run 5 | Run 6 | Run 7 | Run 8 | Run 9 | Run 10 | Run 11 |
| 80 | 1.0 | 2.0 |  | 1.6 | 1.6 | 0.7 | 0.6 | 0.0 | 0.7 | 1.6 | 10.3 |
| 100 | 11.0 | 1.0 |  | 7.3 | 4.6 | 1.8 | 1.0 | 0.8 | 2.1 | 7.3 | 8.4 |
| 150 | 31.0 | 2.0 |  | 30.5 | 11.6 | 23.0 | 4.6 | 2.7 | 7.6 | 30.5 | 8.7 |
| 200 | 25.0 | 19.0 |  | 21.5 | 8.8 | 25.0 | 4.9 | 3.9 | 11.8 | 21.5 | 7.3 |
| 325 | 17.0 | 43.0 |  | 24.1 | 28.1 | 29.4 | 52.4 | 39.4 | 60.8 | 24.1 | 49.5 |
| PAN | 15.0 | 33.0 |  | 15.0 | 45.3 | 20.1 | 36.5 | 53.2 | 17.0 | 15.0 | 15.8 |

(B) Finely divided calcium chloride powder both hydrated and anhydrous produced in the spray dryer was compacted into a hard sheet 1/16 inch to ⅜ inch thick using the equipment described above. Anhydrous calcium chloride was used in Runs A and B, while hydrated calcium chloride was used in Run C. Table III illustrates the conditions for compacting used.

TABLE III.—COMPACTION OF CALCIUM CHLORIDE POWDER

|  | Run A | Run B | Run C |
|---|---|---|---|
| Roll Speed (r.p.m.) | 8.5 | 8.5 | 8.5 |
| Feed Temperature (°F.) | 275 | 275 | 275 |
| Feed Density (lb./ft.³) | 20 | 20 | 63 |
| Moisture in Feed (percent) | 0.9 | 0.9 | 18.6 |
| Roll Pressure (p.s.i.g.) | 3,300 | 3,300 | 3,000 |
| Roll Clearance (inches) | 1/64 | 3/16 | 1/64 |
| Feeder Speed (r.p.m.) | 60 | 60 | 20 |

Table IV below sets forth the properties of the sheet of calcium chloride obtained by compacting calcium chloride powder.

TABLE IV.—PRODUCT FROM COMPACTOR

|  | Run A | Run B | Run C |
|---|---|---|---|
| Sheet Thickness (inches) | 1/16 | ⅜ | 1/16 |
| −14 Mesh Fraction (percent) | 10 | 10 | 6 |
| Rate (lb./hr.) | 160 | 160 | 160 |

*Example II*

To illustrate the effect of aging on the amount of fines produced in the milling step, calcium chloride sheets were aged for various lengths of time before milling. Table VI illustrates that aging for at least 20 minutes decreased the amount of fines (PAN) from 31% to 20%.

TABLE VI.—EFFECT OF AGING ON COMPACTED CALCIUM CHLORIDE

| Aging Time, Minutes | Temperature After Aging, °F. | Screen Analysis After Milling Percent Retained on U.S. Mesh No. | | |
|---|---|---|---|---|
| | | 4 | 14 | PAN |
| 0 | 250 | 23.3 | 45.3 | 31.4 |
| 5 | 240 | 27.0 | 44.4 | 28.6 |
| 10 | 235 | 25.8 | 47.2 | 27.0 |
| 20 | 220 | 29.7 | 50.3 | 20.0 |
| 40 | 220 | 30.6 | 49.2 | 21.2 |
| 60 | 210 | 29.7 | 50.1 | 20.2 |

*Example III*

To illustrate the effect of feed temperature on the compacted product, calcium chloride powder feed at several temperatures was compacted. Table VII illustrates that a feed temperature of about 200° F. is necessary to obtain a compacted product that is hard and does not readily break down. Table VII also illustrates the effect of roll pressure on the compacted product. It discloses that a roll pressure of 2000 to 3500 p.s.i. results in a compacted product that does not readily break down.

TABLE VII.—EFFECT OF TEMPERATURE ON HARDNESS OF COMPACTED PRODUCT

| Feed Temperature, °F. | Roll Pressure, Lbs./In.² | Percent Breakdown |
| --- | --- | --- |
| 185 | 2,900 | 19.9 |
| 185 | 2,900 | 13.5 |
| 210 | 2,600 | 11.1 |
| 210 | 3,250 | 7.2 |
| 230 | 2,500 | 6.6 |
| 230 | 2,900 | 7.3 |
| 250 | 1,400 | 16.9 |
| 250 | 2,500 | 8.7 |
| 250 | 2,900 | 6.2 |
| 265 | 2,500 | 8.4 |
| 270 | 2,700 | 4.4 |
| 275 | 3,300 | 3.8 |
| 300 | 2,850 | 5.1 |
| 300 | 3,000 | 4.8 |

*Example IV*

This example illustrates the superior ice melting and adherence properties of the granular calcium chloride of this invention compared to commercially available calcium chloride pellets.

The following test was conducted on a modern turnpike. A section of the turnpike was divided into three zones: Zone 1 (mp. 64.5 to 72.0), Zone 2 (mp. 72.0 to 83.0) and Zone 3 (mp. 83.0 to 93.0). Two mixtures of calcium chloride and sodium chloride were prepared, hereafter referred to as Mixture A and Mixture B, containing 3 parts by weight of sodium chloride per part of calcium chloride. Mixture A contained granular calcium chloride produced by the process of this invention, while Mixture B contained commercially available calcium chloride pellets.

At approximately 6:30 a.m. of the day this test was conducted, a light snow storm began. Plowing kept the pavement clean of snow until 11:00 a.m., when it became iced over and chemical treatment was necessary. The temperature was 12 to 16° F. during the storm and 1½ inches of snow fell. Mixture A was applied to Zone 2 and Mixture B was applied to Zones 1 and 3. Three applications of each of the mixtures were applied at the rate of about 400 pounds per mile in a six-foot wide pattern at the centerline of the pavement. The total quantity of material applied was as follows:

Zone 1—7.5 miles; 7.0 tons Mixture B
Zone 2—11.0 miles; 4.00 tons Mixture A
Zone 3—10.0 miles; 10.0 tons Mixture B The following observations were made during the test:

(1) The trailing traffic almost instantly caused tracks to show in Zone 2 where Mixture A was applied, while more time was required to observe the same action in Zones 1 and 3 where Mixture B was applied.

(2) The full width of the pavement melted faster in Zone 2 than in Zones 1 or 3.

(3) Approximately 5 feet, or one-half of the 10-foot blacktop pull-off lane from the edge line of the pavement, melted in Zone 2, while the snow and ice in Zones 1 and 3 had barely melted except at some locations where it showed in a very cut up line.

The foregoing test illustrates that Mixture A containing granular calcium chloride produced by the process of this invention has better ice melting properties than Mixture B containing commercially available calcium chloride pellets even though a lesser quantity is used.

Several tests were also carried out to compare the adherence of granular calcium chloride with pellet. In the tests, a pail of each material was spread over the wet pavement and observed as traffic passed over. It was found that granular calcium chloride produced by the process of this invention moved less than half the distance ahead and to the side as did calcium chloride pellets. Thus the physical shape and high particle density of the granular calcium chloride product prevented scattering.

It will be apparent from the foregoing description that the objects of this invention have been attained. A commerically useful process for preparing both powder and granular calcium chloride products has been invented that is extremely versatile and produces numerous calcium chloride products. It is obvious that the products produced by this process have a wide range of applications in the arts.

While this invention has been described and exemplified in terms of its preferred embodiment those skilled in the art will appreciate that modifications can be made without departing from the spirit and scope of this invention.

We claim:

1. A process for preparing finely divided anhydrous calcium chloride powder which consists solely of spraying an aqueous solution containing about 35% to 60% by weight of calcium chloride into an essentially dry gas stream at a temperature of at least about 400° F.

2. A process according to claim 1 wherein said gas is air at a temperature of about 400° to 1500° F.

3. A process for preparing granular anhydrous calcium chloride by initially drying an aqueous solution of calcium chloride, the said drying consisting solely of spraying an aqueous solution containing about 35% to 60% by weight of calcium chloride into an essentially dry gas stream at a temperature of at least about 400° F. to produce finely divided anhydrous calcium chloride powder, and further comprising compacting said powder at a tempearture of at least about 200° F. into a sheet of compacted anhydrous calcium chloride, breaking said sheet into flake-like particles, and crushing said particles to the desired particle size.

4. A process for preparing granular anhydrous calcium chloride by initially drying an aqueous solution of calcium chloride, the said drying consisting solely of spraying an aqueous solution of calcium chloride containing about 35% to 60% by weight of calcium chloride into an essentially dry gas stream at a temperature of at least about 400° F. to produce finely divided anhydrous calcium chloride powder, and further comprising compacting said powder at a temperature of about 200 to 375° F. into a sheet of compacted anhydrous calcium chloride, breaking said sheet into flake-like particles, crushing said particles to the desired particle size, and screening the crushed particles to separate a product of desired particle size.

5. A process for preparing granular anhydrous calcium chloride by initially drying an aqueous solution of calcium chloride, the said drying consisting solely of spraying an aqueous solution of calcium chloride containing about 35% to 60% by weight of calcium chloride into an essentially dry gas stream at a temperature of at least about 400° F. to produce finely divided anhydrous calcium chloride powder, and further comprising compacting said powder at a temperature of about 200 to 375° F. into a sheet of compacted anhydrous calcium chloride, breaking said sheet into flake-like particles, crushing said particles to the desired particle size, screening the crushed particles to separate a product of desired particle size from undesired fine and coarse particles, and recycling said fine particles through the compacting step and said coarse particles through the crushing step.

6. A process for preparing granular anhydrous calcium chloride by initially drying an aqueous solution of calcium chloride, the said drying consisting solely of spraying an aqueous solution of calcium chloride containing about 35% to 60% by weight of calcium chloride into an essentially dry gas stream at a temperature of at least about 400° F. to produce finely divided anhydrous calcium chloride powder, and further comprising compacting said powder at a tempraeture of about 200 to 375° F. into a sheet of compacted anhydrous calcium chloride, breaking said sheet into flake-like particles, aging said particles for at least about 20 minutes, and crushing said aged particles to the desired particle size.

References Cited

UNITED STATES PATENTS

| | | | |
|---|---|---|---|
| 1,157,945 | 10/1915 | Gray | 159—48 X |
| 1,312,019 | 8/1919 | Carr | 23—293 X |
| 1,318,922 | 10/1919 | Rhodes | 23—293 |
| 1,396,028 | 11/1921 | Dickerson | 23—293 X |
| 1,459,082 | 6/1923 | Bartlett | 23—293 |
| 1,497,201 | 6/1924 | Wheat. | |
| 1,546,922 | 7/1925 | Faber. | |
| 1,670,711 | 5/1928 | Bryan et al. | |
| 1,787,887 | 1/1931 | White et al. | 252—70 |
| 1,787,888 | 1/1931 | White et al. | 252—70 |
| 1,801,000 | 4/1931 | Heath | 23—90 XR |
| 1,852,303 | 4/1932 | Heath | 23—90 XR |
| 2,646,343 | 7/1953 | Bennett et al. | 23—90 |
| 2,671,009 | 3/1954 | Comstock | 23—90 |
| 2,857,244 | 10/1958 | Graves | 23—90 |
| 2,882,126 | 4/1959 | Conrad et al. | 23—90 |
| 2,996,759 | 10/1961 | Smith | 264—109 |
| 3,206,279 | 9/1965 | Carnall | 264—109 XR |

FOREIGN PATENTS

| | | |
|---|---|---|
| 649,735 | 10/1962 | Canada. |
| 612,603 | 11/1948 | Great Britain. |

OTHER REFERENCES

Bowen Research Corp. article "Unit Spray-Drying and Reaction-Chambers," Bulletin No. 3–1936, 5 pages. Copy in 23–293A literature.

NORMAN YUDKOFF, *Primary Examiner.*

JULIUS GREENWALD, EDWARD STERN,
*Examiners.*

J. D. WELSH, J. SOFER, *Assistant Examiners.*